Oct. 12, 1948.　　　F. W. ANDERSON　　　2,451,190
STUD WELDING GUN
Filed April 22, 1947
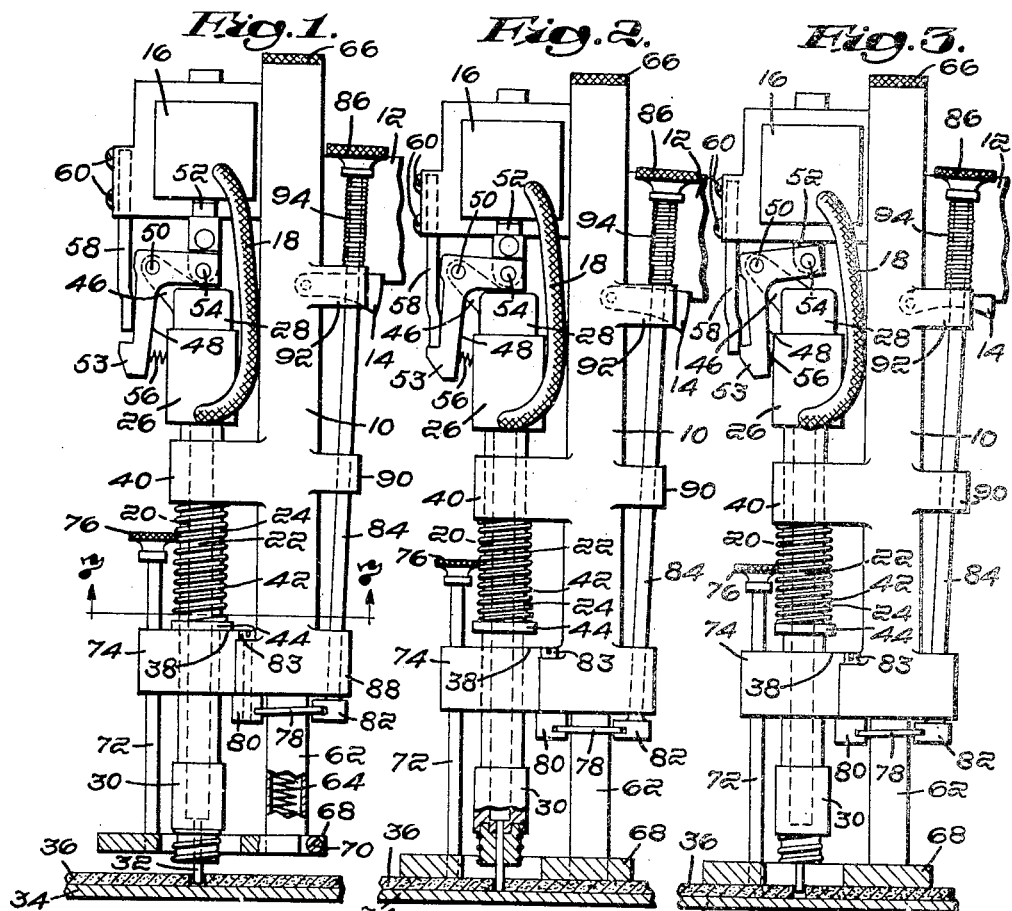
Inventor:
Frank W. Anderson,
by Thomson & Thomson
Attorneys Patented Oct. 12, 1948

2,451,190

UNITED STATES PATENT OFFICE 2,451,190

STUD WELDING GUN

Frank W. Anderson, North Weymouth, Mass.

Application April 22, 1947, Serial No. 743,028

5 Claims. (Cl. 219—4)

This invention relates to improvements in welding devices commonly known as stud welding guns and used primarily for welding studs, bolts and the like to metallic surfaces, such as the decks and bulkheads of naval vessels.

The principal purpose of the invention is to provide a light weight, portable gun with which an accurate arc length may be consistently maintained when making successive stud welds, irrespective of normal deviations in the length of the studs used or of nonuniformity in the surfaces to which the studs are to be welded.

Another purpose of the invention is to provide for the automatic attainment of the gun's arc length setting at the time of making each weld without requiring additional time or effort on the part of the operator to adjust thrust screws, clamps or other mechanisms with which welding guns have heretofore been equipped. The improved guns may thus be conveniently and efficiently operated with one hand.

A further purpose of the invention provides for the supporting of the gun upon a layer of material covering the work without sacrificing the precision with which the arc length can be duplicated, even though the thickness of such covering may vary considerably.

A still further purpose of the invention contemplates the attaching of an arc shield to the gun for use as both a supporting base and eye protector.

Other advantages will be apparent from reference to the ensuing description, and it is to be understood that the invention is not limited to the particular embodiments shown in the accompanying drawings, for other constructions are possible within the scope and spirit of the appended claims.

Referring to the drawings:

Fig. 1 is an elevational view of the improved device, partly in section, showing the initial operational step which consists in abutting a stud held by the gun against the work;

Fig. 2 is a view similar to Fig. 1, but shows the second operational step, which consists in lowering the base plate of the gun against the work;

Fig. 3 is a similar operational view showing the stud retracted from the work to establish an arc;

Figs. 4, 5 and 6 are fragmentary sectional views illustrating the same operational sequence as Figs. 1, 2 and 3, but showing the attachment of an arc shield to the gun instead of the base plate; and illustrating a larger sized stud; and Fig. 7 is a section on line 7—7 of Fig. 1.

The stud welding gun herein chosen for the purpose of illustration comprises a frame 10 with a handle 12, only a part of which is illustrated, partially encasing the trigger switch 14, the purpose of the switch being to cause a remote relay to close a set of contacts in the conventional welding supply line from a generator or other source of welding current. In this way the operator may establish or interrupt the flow of welding current as desired, under the influence of the timing devices with which such circuits are ordinarily equipped. The solenoid or electro-magnet 16, which is connected in series with the welding circuit and is therefore energized by the same current effecting the weld, is rigidly mounted on the frame 10 and is connected by means of the flexible cable 18 to the stud holder designated generally by the reference character 20.

The holder 20 is comprised of a longitudinal conductor rod 22 fixedly contained within a tubular insulator 24, a coupling 26 of fibre insulating material rigidly pinned to the upper end of the rod 22, a metallic plug 28 internally threaded into the top of the coupling 26 and electrically insulated from the upper end of the rod 22 by a thin piece of fish paper or varnished cambric, and a chuck 30 threaded to the lower end of the rod 22 for loosely holding a stud 32 or any other elongated electrode to be welded to a deck plate or other metallic surface.

In this instance, as shown in Fig. 1, the stud or pin 32 is to be welded to a plate 34, and is abutted against said plate to complete the first operational step in the process of welding, there being a layer of thermal insulation 36 shown covering the plate to emphasize the fact that the gun need not rest upon the work itself to make an effective weld, but may rest on such a covering or layer. It will be understood from the foregoing that the stud 32 and plate or work 34 form the electrodes of the welding circuit and that the current from the welding generator first passes through the series solenoid 16 and the conductor rod 22 of the stud holder 20 before being conducted through the stud and back to said generator via the plate. The insulating sheet 36 may be of the type commonly applied to deck plates or partitions in shipbuilding, and will be retained in place against the plate 34 by fastenings applied to the welded studs 32, in accordance with common practice.

The holder 20 is longitudinally guided by the vertically aligned bearings 38 and 40 which are integral with the frame 10. The lower end of a coil spring 42 is abutted against a washer 44 fixedly secured to the holder 20, while the upper end of the spring is constrained by the underside of the guide bearing 40. The holder 20 is thereby effectually urged downward towards the work 34 to produce contact between the stud and said work. The spring 42, however, is sufficiently compressible so that it will yield, when the solenoid is energized by the flow of welding current, to allow the holder and stud to be retracted for the striking of an arc (Fig. 3).

Diagonally extending upwardly from the crown of the plug 28 is an apertured lug 46 to which a dog 48 is pivotally connected by means of a pin 50. The horizontal portion of the dog 48 is pivotally attached to the armature 52 of the solenoid 16 by means of a pin 54, and a latch portion 53 of said dog is normally urged outwardly by the thrust of the small spring 56, thus causing engagement with the stop 58 which is suitably secured to the solenoid 16 as by the screws 60. When the solenoid 16 is energized, the dog 48 is disengaged from the stop 58, for the armature 52 is then attracted upwardly causing the dog to pivot, the latch portion of said dog at that time being pivoted sufficiently inward to effect the disengagement. It will be understood that the retracted movement of the holder 20 is thereby definitely established, because the stop 58 determines the initial position and the abutment of the armature 52 against the core of the solenoid 16 determines the final position, the retracted movement being the travel between these two points.

The frame 10 is of tubular form so that a leg 62, also tubular, may be slidably received therein to provide a means by which the frame may be vertically adjusted with respect to the work 34. In order that the leg 62 will be extensibly urged toward the work, a relatively long coil spring 64 is supplied within the leg, the top end of said spring being compressed against the thumb nut 66 to provide the necessary force tending to urge the leg downwardly with respect to the frame. The lower end of the leg 62 is provided with an annular base plate 68 for supporting the frame 10 perpendicularly with respect to the work 34. This base plate is clamped to the leg by the screw 70 and, therefore, can be removed for the attaching of an arc shield, as will be subsequently described. The stud 32, held by the holder 20, passes through the base plate and alignment therewith is maintained by a vertical guide rod 72 having its lower end threaded into the base plate and its upper end guided by a bearing 74, a lateral extension of the bearing 38. A stop nut 76, threaded on the rod 72, prevents the complete ejectment of the leg 62 from the frame.

A washer 78, loosely surrounding a section of the leg 62, is held in position by the notch blocks 80 and 82, the block 80 being rigidly mounted to the frame 10 by a screw 83, and the block 82 being attached to a movable release rod 84. The rod 84 is of sufficient length to bring its upper end conveniently within reach of the operator who is grasping the handle 12, and a thumb nut 86 adjacent the handle 12 providing a suitable means by which the rod may be depressed.

Three bearings 88, 90 and 92 slidably hold the rod 84 with respect to the frame 10, and a coil spring 94, spaced intermediate the bearing 92 and the thumb nut 86, normally biases the rod upwardly to cause the washer 78 to bind or lock against the leg 62. The binding of the washer 78 securely retains the leg in a preferred operable relation with the frame, this preferred relation being automatically attained when the washer 78 is released by the depressing of the thumb nut 86 and when the frame 10 is simultaneously lowered until the base plate 68 rests firmly on the cover sheet 36. As shown in Fig. 2, the stop 58 is engaged at this point by the latch 53 of the dog 48, thereby to arrest the yielding movement of the holder 20 with respect to the frame 10. The removal of the operator's thumb from the thumb nut 86 retains the thus obtained operable relationship of the welding gun, preparatory to striking an arc.

In Figs. 4, 5 and 6 there is shown an alternate embodiment of the invention in which an arc shield 100 has been substituted for the previously employed base plate 68. The operational sequence in this case is identical with that illustrated in Figs. 1, 2 and 3, for the lower end of the arc shield is intended to support the welding gun, and the stud moves longitudinally within the shield in striking the welding arc in a manner similar to the first embodiment. In order to compensate for the length of the shield 100, a different chuck 102 is used having four relatively long prongs 104, which loosely hold a large stud 105 in an extended position from the bottom end of the shield to produce the necessary contact between the stud and the plate 34. The bearing washer 106, made of insulating material which is adhesively or otherwise attached to the bore of the shield 100, allows the chuck to be freely reciprocated within the washer, the purpose of the washer being to conceal the rays from the arc that would otherwise emerge vertically. With the exception of the aforesaid parts, all of the other elements of the gun are the same as those previously referred to in describing the first embodiment of the invention.

The operation of the device is as follows: The stop 58 is adjusted vertically to predetermine the length of arc gap for the particular type of welding to be done; a lowering of the stop will increase the length of arc and a raising of the stop will decrease the arc length. Regulation of the stop is necessary, however, only when the gun is to be used with a stud of radically different size or upon radically different work material; for the automatic adjustment of the arc gap will compensate for normal variations, as aforesaid. As heretofore explained, this regulation establishes the point from which the arc will be initiated, and the abutting of the armature 52 against the core of the solenoid 16 will provide the uppermost point.

After the gun is connected to a conventional welding circuit, neither the generator, the welding cable nor the control wiring contactors or timing devices being shown in the drawing, a stud 32 is inserted in the chuck 30, and the gun is lowered towards the work 34 to produce contact between the stud and the work, as shown in Fig. 1. It will be noticed that the leg 62 is retained in a partially extended position by the washer 78, caused to be cocked by the release rod 84 which is biased upward by the action of the spring 94, but may be in any other position, either partially or fully extended, as its relationship at this instant is immaterial. However, in Fig. 2, as the gun frame is lowered further, the release rod 84 is depressed by the operator to allow the leg 62 to be automatically moved into a preferred operable relationship with the frame 10, the spring 42 yielding to allow relative movement between the frame 10 and holder 20 until such movement is arrested by the engagement of the dog 48 with the stop 58.

It will be apparent that if the leg 62 is not extended far enough from the frame 10 before release of the rod 84, the spring 64 will urge the leg 62 from the frame an amount sufficient to produce supporting contact between the base plate 68 and the insulation layer 36. The converse is true if the leg 62 is extended too far, as the spring 64 will then yield after contact has been produced between the base plate 68 and the sheet 36 until the stop 58 is engaged by the dog 48. In this way, the gun is effortlessly adjusted, irrespective of nonuniformity in either the work or length of studs, and the mere removal of the operator's thumb from the nut 86 maintains such an adjusted position for the one particular weld, the gun, of course, being similarly adjusted for subsequent welds in the same manner.

The gun is now set for the striking of an arc, which is accomplished by squeezing the trigger switch 14. The solenoid 16 is immediately energized thereupon by the resulting flow of welding current through said solenoid, the holder 20, the stud 32 and the plate 34 and, when thus energized, the armature 52 is lifted, causing the dog 48 to pivot and thereby disengage its latch 53 from the stop 58. A further lifting of the armature 52, now possible because of the disengagement of the latch, retracts the holder 20 and stud 32 a predetermined distance to cause an arc to be struck having a length equivalent to said distance (Fig. 3).

In the conventional contactor-timer circuit, the flow of welding current is automatically interrupted by the opening of the contactor in response to actuation of the timer, thereby de-energizing the solenoid 16 and allowing the holder 20 and stud 32 to be plunged against the plate 34, under action of the spring 42 which has been compressed previously by the lowering of the gun against the work. The welding of the stud is thus effected and, as the stud is only loosely held by the chuck 30, raising the gun will free the stud from the holder. The gun may now be moved to the next location for the welding of another stud, the same sequence of operations being repeated.

I claim:

1. A welding device of the character described comprising a frame, a stud holder movable longitudinally of the frame, means yieldingly urging the stud holder toward the work so that a stud received in said holder is pressed against the work when the bottom of the frame rests thereon, an electro-magnet mounted on said frame and having a movable armature, a dog pivotally connected to said holder and said armature for retracting the holder and stud when the magnet is energized, said dog having a latch, a stop member engaged by said latch when the bottom of the frame rests on the work and the magnet is deenergized, said latch being moved out of engagement with said stop member by movement of said armature upon energization of the magnet, whereby the holder is retracted and the stud moved a predetermined distance from the work.

2. A welding device comprising a frame, a supporting leg having one end slidably received by the frame and the other end adapted to rest upon the work to which a stud is to be welded, spring means extensibly urging said leg from the frame, means for retaining said leg in a preferred operable relationship with the frame, a holder longitudinally guided by the frame for loosely holding said stud, pressure means yieldingly urging said holder toward the work to thereby produce contact between said stud and work, electro-magnetic means for retracting said holder and stud away from the work, a stop associated with said means, a dog pivotally connected to said holder having one portion co-operating with the armature of said electro-magnetic means and another portion engageable with said stop, said pressure means being adapted to yield until the movement of the holder is arrested by the engagement of said dog with said stop when the stud is initially forced against the work, thus determining said aforementioned operable relationship of said leg with the frame so that, when the electro-magnetic means is energized, said dog is disengaged from the stop and the holder is retracted to strike a preferred arc length, the stud being plunged against the work by said pressure means when said electro-magnetic means is de-energized.

3. A welding device comprising a frame provided with a longitudinal recess, a tubular leg having one end slidably received by said recess and the other end provided with an annular base plate for suppporting said frame perpendicularly with respect to the work to which a stud is to be welded, a coil spring abutting against the closed end of said recess and extensibly urging said leg from the frame, a releasable means for retaining said leg in a preferred operable relationship with the frame, a holder longitudinally guided by the frame for loosely holding said stud, the lower end of said holder and stud passing through said annular base plate, pressure means yieldingly urging said holder toward the work to thereby produce contact between said stud and work, electro-magnetic means for retracting said holder and stud away from the work, a stop associated with said means, a dog pivotally connected to said holder having one portion co-operating with the armature of said electro-magnetic means and another portion engageable with said stop, said pressure means being adapted to yield until the movement of the holder is arrested by the engagement of said dog with said stop when the stud is initially forced against the work, thus determining said aforementioned operable relationship of said leg with the frame so that, when the electro-magnetic means is energized, said dog is disengaged from the stop and the holder is retracted to strike a preferred arc length, the stud being plunged against the work by said pressure means when said electro-magnetic means is de-energized.

4. A welding device comprising a frame provided with a longitudinal recess, a tubular leg having one end slidably received by said recess and the other end provided with an annular base plate for supporting the frame perpendicularly with respect to the work to which a stud is to be welded, the stud forming one electrode and the work the other electrode when the device is connected to a suitable source of welding current, a coil spring abutting against the closed end of said recess and extensibly urging said leg from the frame, a washer loosely surrounding a section of said tubular leg, means mounted on said frame in engagement with a segment of said washer to normally bias said washer in a binding position against the leg whereby said leg may be retained in a preferred operable relationship with the frame, said means being adapted to be released by thumb pressure exerted by the operator, a holder longitudinally guided by the frame for loosely holding said stud, a coil spring surrounding a part of the holder, said holder having a lateral projection against which the lower end of said spring abuts and the frame having a projection against which the upper end abuts whereby said holder is urged toward the work to produce contact between said stud and work, a solenoid fixedly mounted to said frame having a movable armature for retracting said holder and stud away from the work, said solenoid being electrically connected in series with said holder and said source of welding current, a stop associated with said solenoid, a dog pivotally connected to said holder having one portion co-operating with said armature and another portion engageable with said stop, said last-mentioned coil spring being adapted to yield until the movement of the holder is arrested by the engagement of said dog with said stop when the stud is initially forced against the work, thus determining said aforementioned operable relationship of said leg with the frame so that, when the solenoid is energized, said dog is disengaged from the stop and the holder is retracted to strike a preferred arc length irrespective of irregularities in the surface of the work, the stud being plunged against the work by said last-mentioned coil spring when said solenoid is de-energized.

5. A welding device comprising a frame, a leg having one end slidably received by the frame and the other end provided with a substantially cylindrical arc guard fixedly attached thereto for supporting the frame with respect to the work to which a stud is to be welded, spring means extensibly urging said leg from the frame, releasable means for retaining said leg in a preferred operable relationship with the frame, a holder longitudinally guided by the frame for loosely holding said stud, the lower end of said holder and stud moving within said arc guard which is of sufficient length to effectually conceal the welding arc, pressure means urging said holder toward the work to thereby produce contact between said stud and work, electro-magnetic means for retracting said holder and stud away from the work, a stop associated with said means, a dog pivotally connected to said holder having one portion co-operating with the armature of said electro-magnetic means and another portion engageable with said stop, said pressure means being adapted to yield until the movement of the holder is arrested by the engagement of said dog with said stop when the stud is initially forced against the work, thus determining said aforementioned operable relationship of said leg with the frame so that, when the electro-magnetic means is energized, said dog is disengaged from the stop and the holder is retracted to strike a preferred arc length, the stud being plunged against the work by said pressure means when said electro-magnetic means is de-energized.

FRANK W. ANDERSON.

REFERENCES CITED

The following references are of record in the file of this patent:

UNITED STATES PATENTS

| Number | Name | Date |
|---|---|---|
| Re. 22,317 | Nelson | May 18, 1943 |
| 1,359,620 | Ritchey et al. | Nov. 23, 1920 |
| 2,191,494 | Nelson | Feb. 27, 1940 |
| 2,265,169 | Hughes et al. | Dec. 9, 1941 |
| 2,356,320 | Hughes | Aug. 22, 1944 |
| 2,405,177 | Beckett | Aug. 6, 1946 |